US012644976B2

(12) United States Patent
Lee et al.

(10) Patent No.: US 12,644,976 B2
(45) Date of Patent: Jun. 2, 2026

(54) SYSTEM AND METHOD FOR PROCESSING RADAR DATA

(71) Applicant: BITSENSING INC., Seongnam-si (KR)

(72) Inventors: Hyeon Kyu Lee, Seongnam-si (KR); Yu Min Han, Hwaseong-si (KR); Hee Mang Song, Seoul (KR)

(73) Assignee: BITSENSING INC., Seongnam-si (KR)

( * ) Notice: Subject to any disclaimer, the term of this patent is extended or adjusted under 35 U.S.C. 154(b) by 223 days.

(21) Appl. No.: 18/398,379

(22) Filed: Dec. 28, 2023

(65) Prior Publication Data

US 2025/0199150 A1 Jun. 19, 2025

(30) Foreign Application Priority Data

Dec. 18, 2023 (KR) ......................... 10-2023-0184382

(51) Int. Cl.
G01S 13/42 (2006.01)
G01S 7/41 (2006.01)
G01S 13/89 (2006.01)
(52) U.S. Cl.
CPC ............ G01S 13/426 (2013.01); G01S 7/417 (2013.01); G01S 13/89 (2013.01)
(58) Field of Classification Search
CPC ........ G01S 13/426; G01S 7/417; G01S 13/89; G01S 17/58; G01S 17/89
USPC ......................................................... 342/195
See application file for complete search history.

(56) References Cited

U.S. PATENT DOCUMENTS

| | | | | |
|---|---|---|---|---|
| 9,903,945 | B2 * | 2/2018 | Song | G01S 13/931 |
| 10,515,304 | B2 * | 12/2019 | Towal | G06N 3/08 |
| 10,732,261 | B1 * | 8/2020 | Wang | G05D 1/0257 |
| 11,054,515 | B2 * | 7/2021 | Cohen | G01S 13/58 |
| 11,340,332 | B2 * | 5/2022 | Cho | G01S 13/931 |

(Continued)

FOREIGN PATENT DOCUMENTS

| | | | | |
|---|---|---|---|---|
| CN | 111929672 A | * 11/2020 | ........... | G01S 13/723 |
| EP | 2317334 A2 | * 5/2011 | ........... | G01S 7/2927 |

(Continued)

OTHER PUBLICATIONS

Extended European Search Report for EP Application No. 23220393.5 dated Jun. 13, 2024.

(Continued)

*Primary Examiner* — Nuzhat Pervin
(74) *Attorney, Agent, or Firm* — Dinsmore & Shohl LLP; Yongosk Choi, Esq.

(57) ABSTRACT

A system for processing radar data includes a radar device, at least one processor, and at least one memory including a computer program code. The at least one memory and the computer program code are configured to, with the at least one processor, cause the system to, acquire, from the radar device, first radar data corresponding to a target area and second radar data generated before the first radar data, convert at least a part of the second radar data based on a time difference between a time point at which the first radar data is acquired and a time point at which the second radar data is acquired, and generate refined data by considering the converted second radar data for trajectory processing along with the first radar data.

8 Claims, 10 Drawing Sheets

330

ESTIMATE VELOCITY OF POINT CLOUD DATA —331

CONVERT COORDINATE SYSTEM OF POINT CLOUD DATA —332

PREDICT LOCATION OF POINT CLOUD DATA —333

CONVERT SOME ATTRIBUTES OF POINT CLOUD DATA —334

ACCUMULATE POINT CLOUD DATA —335

MATCH POINT CLOUD DATA TO MAP —336

(56) References Cited

U.S. PATENT DOCUMENTS

| | | | | |
|---|---|---|---|---|
| 11,719,811 B2 * | 8/2023 | Cho | ........................ | G06N 3/094 |
| | | | | 342/350 |
| 11,827,214 B2 * | 11/2023 | Amirloo Abolfathi | ...................... | |
| | | | | B60W 60/00276 |
| 12,156,728 B2 * | 12/2024 | Yarkoni | ............... | A61B 5/0507 |
| 12,189,026 B1 * | 1/2025 | Alferdaous Alazem | .................... | |
| | | | | G01S 7/403 |
| 12,276,726 B1 * | 4/2025 | Abdeldayem | ......... | G01S 13/878 |
| 12,406,583 B2 * | 9/2025 | Al Faruque | .......... | G06N 3/0442 |
| 2011/0102248 A1 * | 5/2011 | Maeno | ................. | G01S 7/2927 |
| | | | | 342/179 |
| 2013/0265189 A1 * | 10/2013 | Chang | ................. | G01S 13/865 |
| | | | | 342/52 |
| 2017/0356993 A1 * | 12/2017 | Lee | ......................... | G01S 13/93 |
| 2020/0241122 A1 * | 7/2020 | Achour | ................. | G01S 13/931 |
| 2020/0349362 A1 * | 11/2020 | Maloney | ................... | G06T 7/73 |
| 2021/0056705 A1 * | 2/2021 | Pfeiffer | ............... | G05D 1/0253 |
| 2021/0318412 A1 * | 10/2021 | Strauss | ................... | G01S 7/292 |
| 2022/0327863 A1 * | 10/2022 | Lee | ......................... | G01S 7/417 |
| 2023/0017983 A1 * | 1/2023 | Kunz | ................... | G01S 13/931 |

| | | | | |
|---|---|---|---|---|
| 2023/0110069 A1 * | 4/2023 | Salter | .................... | G01S 13/931 |
| | | | | 296/180.4 |
| 2023/0194664 A1 * | 6/2023 | Strauss | .................. | G06N 3/044 |
| | | | | 342/196 |
| 2023/0221408 A1 * | 7/2023 | Zhang | .................. | G01S 13/865 |
| | | | | 342/54 |
| 2023/0384418 A1 * | 11/2023 | Jeannin | ................. | G01S 13/584 |
| 2024/0192369 A1 * | 6/2024 | Chauhan | ............... | G01S 13/865 |
| 2024/0337761 A1 * | 10/2024 | Sohtell | ...................... | G01S 7/40 |
| 2024/0353545 A1 * | 10/2024 | Sun | ......................... | G01S 7/497 |
| 2024/0361445 A1 * | 10/2024 | Paker | ...................... | G01S 13/42 |

FOREIGN PATENT DOCUMENTS

| | | | | | |
|---|---|---|---|---|---|
| EP | | 4369028 A1 * | 5/2024 | ........... | G01S 7/4802 |
| WO | WO-2022088723 A1 * | | 5/2022 | ............. | G01S 17/86 |

OTHER PUBLICATIONS

Niederlohner Daniel, et al., "Self-Supervised Velocity Estimation for Automotive Radar Object Detection Networks", Jul. 7, 2022.

* cited by examiner

330

| ESTIMATE VELOCITY OF POINT CLOUD DATA | ~331 |
| CONVERT COORDINATE SYSTEM OF POINT CLOUD DATA | ~332 |
| PREDICT LOCATION OF POINT CLOUD DATA | ~333 |
| CONVERT SOME ATTRIBUTES OF POINT CLOUD DATA | ~334 |
| ACCUMULATE POINT CLOUD DATA | ~335 |
| MATCH POINT CLOUD DATA TO MAP | ~336 |

FIG. 4

FIG. 5B track N track 2 track 1 car
long vehicle
pedestrian
two wheelers

Comparison of target distribution

FIG. 8

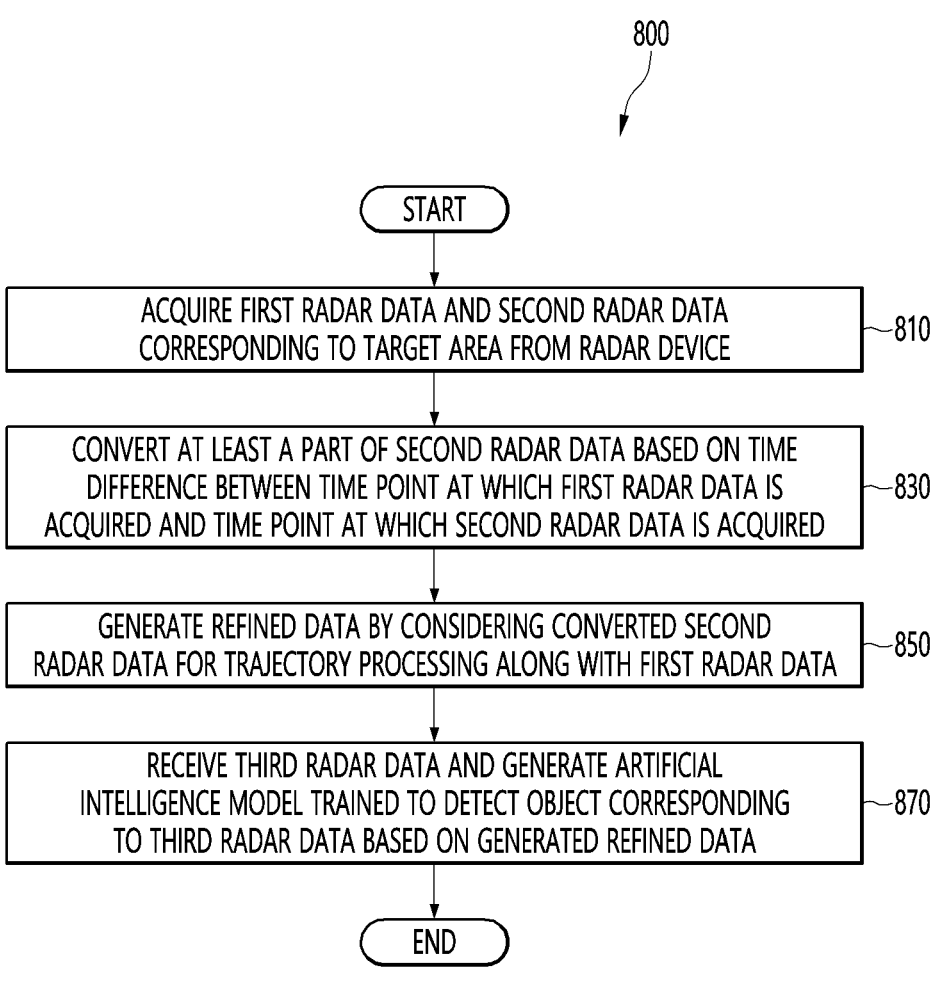

800

START

ACQUIRE FIRST RADAR DATA AND SECOND RADAR DATA CORRESPONDING TO TARGET AREA FROM RADAR DEVICE ~810

CONVERT AT LEAST A PART OF SECOND RADAR DATA BASED ON TIME DIFFERENCE BETWEEN TIME POINT AT WHICH FIRST RADAR DATA IS ACQUIRED AND TIME POINT AT WHICH SECOND RADAR DATA IS ACQUIRED ~830

GENERATE REFINED DATA BY CONSIDERING CONVERTED SECOND RADAR DATA FOR TRAJECTORY PROCESSING ALONG WITH FIRST RADAR DATA ~850

RECEIVE THIRD RADAR DATA AND GENERATE ARTIFICIAL INTELLIGENCE MODEL TRAINED TO DETECT OBJECT CORRESPONDING TO THIRD RADAR DATA BASED ON GENERATED REFINED DATA ~870

END

SYSTEM AND METHOD FOR PROCESSING RADAR DATA

CROSS-REFERENCE TO RELATED APPLICATION

This application claims the benefit under 35 USC 119 (a) of Korean Patent Applications No. 10-2023-0184382 filed on Dec. 18, 2023 in the Korean Intellectual Property Office, the entire disclosures of which are incorporated herein by reference for all purposes.

TECHNICAL FIELD

The present disclosure relates to a system and method for processing radar data.

BACKGROUND

A radar sensor has a high accuracy depending on a detection distance, provides robust sensing performance even under severe conditions such as bad weather or night time, and can collect various feature information such as range, velocity, and angle. Also, the radar sensor is highly accessible because it is cheaper than a LIDAR sensor. A four-dimensional (4D) imaging radar has elevation data of an object and enables the object to be seen more stereoscopically. Thus, the 4D imaging radar has been receiving a lot of attention as next-generation radar technology.

Recently, in the field of LiDAR sensor-based artificial intelligence technology, there have been actively developed end-to-end models by which point cloud data is voxelized and directly applicable to the world coordinate system. Also, there have been developed technology by which it is possible to obtain high recognition performance by learning features of a point cloud via machine learning and deep learning. However, it is difficult for the radar sensor to achieve artificial intelligence performance of the LiDAR sensor because the radar sensor provides sparse point cloud data compared to the LiDAR sensor.

SUMMARY

In view of the foregoing, the present disclosure is conceived to provide a system and method for advancing and augmenting sparse point cloud data of a radar device to train an artificial intelligence model.

Also, the present disclosure is conceived to improve object recognition performance by training an artificial intelligence model with processed point cloud data of a radar.

The problems to be solved by the present disclosure are not limited to the above-described problems. There may be other problems to be solved by the present disclosure.

A system for processing radar data according to an embodiment of the present disclosure includes, a radar device, at least one processor and at least one memory including a computer program code, wherein the at least one memory and the computer program code are configured to, with the at least one processor, cause the system to, acquire, from the radar device, first radar data corresponding to a target area and second radar data generated prior to the generation of the first radar data, convert at least a part of the second radar data based on a time difference between a time point at which the first radar data is acquired and a time point at which the second radar data is acquired, and generate refined data by considering the converted second radar data for trajectory processing along with the first radar data.

A method for processing radar data according to an embodiment of the present disclosure includes, acquiring first radar data corresponding to a target area and second radar data generated prior to the generation of the first radar data from a radar device, converting at least a part of the second radar data based on a time difference between a time point at which the first radar data is acquired and a time point at which the second radar data is acquired, and generating refined data by considering the converted second radar data for trajectory processing along with the first radar data.

According to an embodiment of the present disclosure, point cloud data of a radar device are processed and used for an artificial intelligence model, and, thus, it is possible to improve the accuracy in recognition of an object.

Also, various radar data is combined and used for an artificial intelligence model for advanced object recognition to acquire information about a surrounding environment as well as information about the object, and, thus, it is possible to improve the reliability of autonomous driving.

BRIEF DESCRIPTION OF THE DRAWINGS

In the detailed description that follows, embodiments are described as illustrations only since various changes and modifications will become apparent to a person with ordinary skill in the art from the following detailed description. The use of the same reference numbers in different figures indicates similar or identical items.

FIG. 4 shows an example process of accumulating radar data according to an embodiment of the present disclosure.

FIG. 5A and FIG. 5B are flowchart showing a training process of an artificial intelligence model by the system for processing radar data according to an embodiment of the present disclosure.

FIG. 8 is a flowchart showing a method for processing radar data according to an embodiment of the present disclosure.

DETAILED DESCRIPTION

Figure 1:
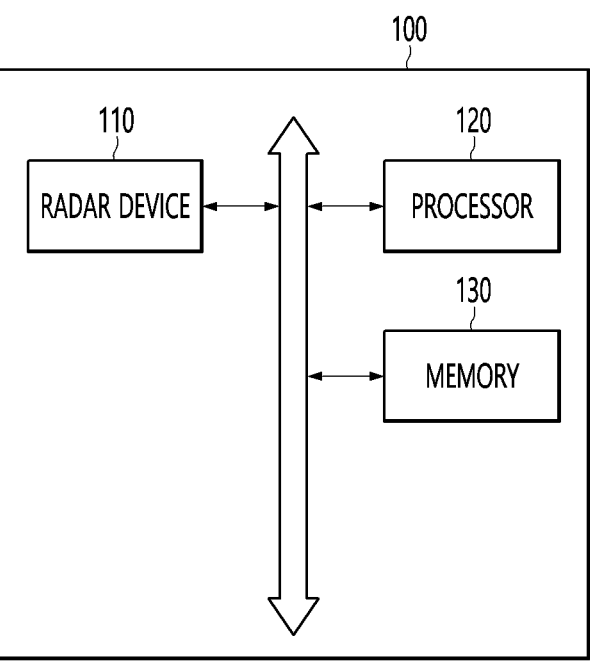
FIG. 1 shows the configuration of a system for processing radar data according to an embodiment of the present disclosure.

Hereinafter, embodiments of the present disclosure will be described in detail with reference to the accompanying drawings to be readily implemented by a person with ordinary skill in the art to which the present disclosure belongs. However, it is to be noted that the present disclosure is not limited to the example embodiments but can be embodied in various other ways. In the drawings, parts irrelevant to the description are omitted in order to clearly explain the present disclosure, and like reference numerals denote like parts through the whole document.

Through the whole document, when a member is said to be located "on" another member, this includes not only the case where the member is in contact with the other member, but also the case where another member exists between the two members.

Through the whole document, when a part "comprises or includes" a certain components, this means that it may further include other components rather than excluding other components unless specifically stated to the contrary.

As used through the whole document, the terms "about", "substantially", etc. are used to mean at or close to that value when manufacturing and material tolerances inherent to the stated meaning are presented, it is used to prevent unscrupulous infringers from taking unfair advantage of disclosures in which precise or absolute figures are mentioned to help understanding of the present disclosure. The term "step of" or "step of" as used through the whole document does not mean "step for."

Through the whole document, the term "combination(s) thereof" included in the Markushi format expression means a mixture or combination of one or more selected from a group consisting of the components described in the Markushi format expression, and means containing one or more selected from the group consisting of the above components.

Through the whole document, references to "A and/or B" mean "A or B, or A and B."

Hereinafter, embodiments of the present disclosure will be described in detail with reference to the accompanying drawings. However, the present disclosure may not be limited to these implementations, examples, and drawings.

FIG. 1 shows the configuration of a system 100 for processing radar data according to an embodiment of the present disclosure.

Referring to FIG. 1, the system 100 for processing radar data according to an embodiment may include a radar device 110, a processor 120 and/or a memory 130.

The radar device 110 may detect an object by measuring a reflected wave generated by reflection of an electromagnetic wave irradiated onto the object and determine the direction, distance and speed of the object. According to an embodiment, the radar device 110 may include an antenna corresponding to a transmitter that transmits the electromagnetic wave and an antenna corresponding to a receiver that receives the reflected wave.

The radar device 110 may be a 4D imaging radar sensor, and may acquire radar data including analysis information about the correlation between the width and height of a track and radar point cloud data by applying signal processing as well as range, velocity, elevation, and azimuth. The radar device 110 may be provided to acquire radar data corresponding to a predetermined range (e.g., a target area). For example, the radar device 110 may be provided in plural, and may be provided on each of the front, the front right, the front left, the back, the back right and/or the back left of a vehicle.

For example, the processor 120 may execute software (e.g., a program) to control at least one of other components (e.g., hardware or software components) of the system 100 for processing data of a radar connected to the processor 120, and may perform various data processing or computation. According to an embodiment, as at least a part of the data processing or computation, the processor 120 may store a command or data received from another component in a volatile memory, process the command or data stored in the volatile memory, and store resulting data in a non-volatile memory.

According to an embodiment, the processor 120 may include a main processor (e.g., a central processing unit or an application processor) or an auxiliary processor (e.g., a graphics processing unit, a neural processing unit (NPU), an image signal processor, a sensor hub processor, or a communication processor) that is operable independently from or in conjunction with the main processor. For example, the auxiliary processor may be adapted to consume less power than the main processor, or to be specific to a specified function. The auxiliary processor may be implemented as separate from or as a part of the main processor.

The auxiliary processor may control at least a part of functions or states related to at least one component among the components of the system 100 for processing radar data, instead of the main processor while the main processor is in an inactive (e.g., sleep) state, or together with the main processor while the main processor is in an activated state (e.g., executing an application). According to an embodiment, the auxiliary processor (e.g., an image signal processor or a communication processor) may be implemented as a part of another component functionally related to the auxiliary processor. According to an embodiment, the auxiliary processor (e.g., an NPU) may include a hardware structure specified for artificial intelligence model processing. An artificial intelligence model may be generated by machine learning. Such learning may be performed by, for example, a machine learning-based noise filtering device 200 in which an artificial intelligence model is executed, or performed via a separate server. Learning algorithms may include, for example, supervised learning, unsupervised learning, semi-supervised learning, or reinforcement learning, but are not limited thereto. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The artificial intelligence model may additionally or alternatively include a software structure other than the hardware structure.

The memory 130 may store various data used by at least one component (e.g., the processor 120) of the system 100 for processing radar data. The data may include, for example, software (e.g., a program) and input data or output data for a command related thereto. The memory 130 may include a volatile memory or a non-volatile memory. The program may be stored in the memory 130 as software, and may include, for example, an operating system, middleware, or an application.

The system 100 for processing radar data according to an embodiment may acquire radar data (e.g., first radar data and second radar data) corresponding to a target area through the radar device 110. The target area may correspond to a field of view (FOV) of the radar device 110. The radar data may be point cloud data including range, azimuth and elevation acquired by the radar device 110 corresponding to the imaging radar.

Figure 2:
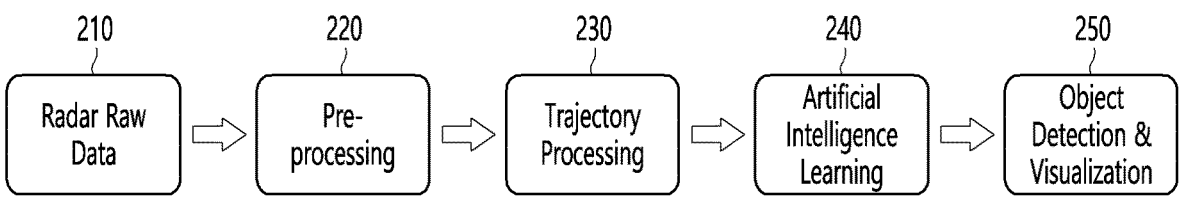
FIG. 2 is a flowchart showing the sequence of operations of the system for processing radar data according to an embodiment of the present disclosure.

FIG. 2 is a flowchart showing the sequence of operations of the system for processing radar data according to an embodiment of the present disclosure.

Referring to FIG. 2, the system 100 for processing radar data according to an embodiment (e.g., the processor 120) may acquire, from the radar device 110, radar data (e.g., first radar data and second radar data) corresponding to the target area in an operation 210. Herein, the first radar data may include data acquired at a first scan time point, and the second radar data may include data acquired at at least one second scan time point prior to the first scan time point.

In an embodiment, the radar device 110 may sequentially acquire radar data at respective scan time points according to a predetermined cycle time. For example, the first radar data may be data acquired at a current scan time point scan(n), and the second radar data may be data acquired at a previous scan time point scan(n−1) prior to the current scan time point scan(n). For example, the second scan time point may include a predetermined number of time points, and the second radar data may include data respectively acquired at a predetermined number of previous scan time points scan(n−1), scan(n−2), . . . .

In an embodiment, the system 100 for processing radar data may pre-process the acquired radar data in an operation 220. For example, the system 100 for processing radar data may perform a pre-processing operation, such as Peak Detection, CFAR (Constant False Alarm Rate) or Ghost Filter, on the radar data. For example, the pre-processed radar data may include point cloud data including range, azimuth, elevation, velocity, power, etc.

In an embodiment, the system 100 for processing radar data may generate refined data by accumulating the pre-processed radar data (trajectory processing) in an operation 230. Details of the trajectory processing will be described later.

In an embodiment, the system 100 for processing radar data may train an artificial intelligence model based on the generated refined data (artificial intelligence learning) in an operation 240. In an embodiment, the system 100 for processing radar data may further train the artificial intelligence model based on data (e.g., [x, y, z, intensity]) acquired from a camera sensor or a LIDAR sensor.

In an embodiment, the system 100 for processing radar data may detect and visualize an object based on the artificial intelligence model (object detection & visualization) in an operation 250.

Figure 3A:
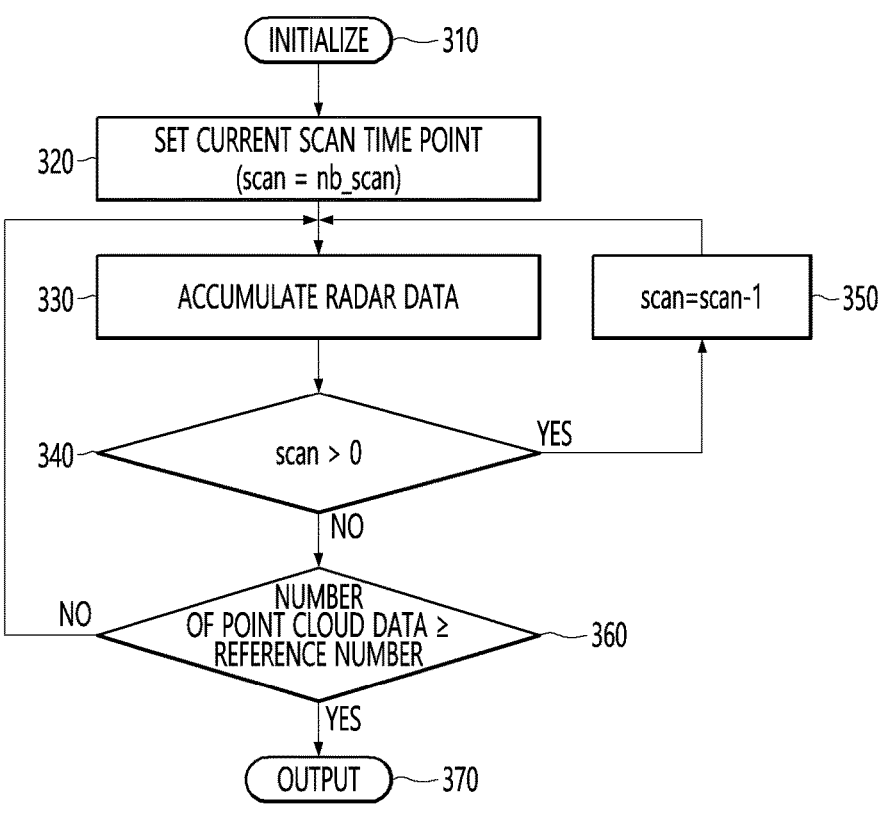
FIG. 3A and FIG. 3B are flowcharts showing a process of accumulating radar data according to an embodiment of the present disclosure.
Figure 3B:
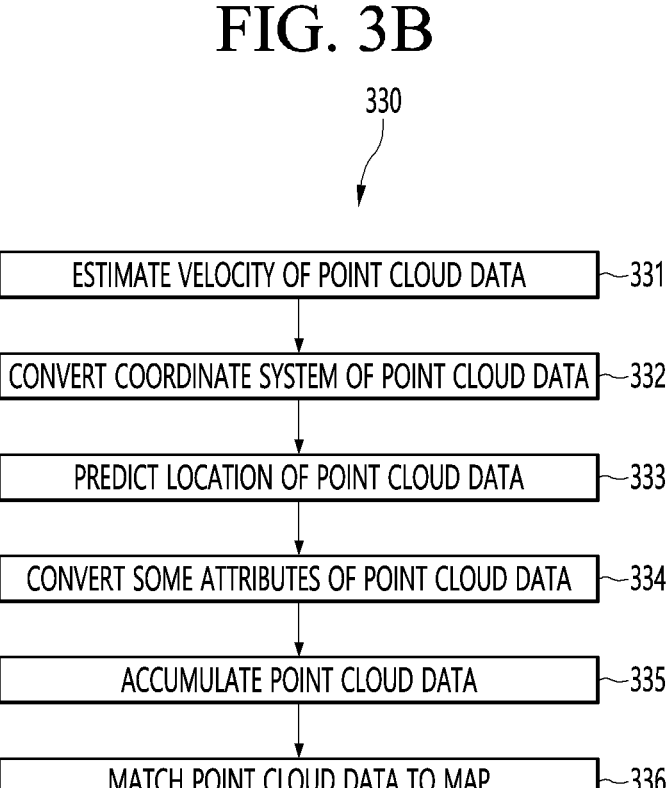

FIG. 3A and FIG. 3B are flowcharts showing a process of accumulating radar data according to an embodiment of the present disclosure.

Referring to FIG. 3A and FIG. 3B, the system 100 for processing radar data according to an embodiment may perform initialization in an operation 310. For example, the system 100 for processing radar data may initialize the point cloud data and variables and previously determine the number of previous scan time points to accumulate data in the initialization operation.

The system 100 for processing radar data according to an embodiment may set a current scan time point (scan=nb_scan) in an operation 320. Herein, the term "nb_scan" may refer to the number of previous scan time points to accumulate data, which was determined in the operation 310. For example, radar data cannot be accumulated from an initial scan time point scan(0) to reach a predetermined number of previous scan time points nb_scan.

The system 100 for processing radar data according to an embodiment may accumulate the radar data (e.g., the second radar data) for a previous scan time point to the radar data (e.g., the first radar data) for the current scan time point scan(nb_scan) in an operation 330.

The system 100 for processing radar data according to an embodiment may sequentially and repeatedly accumulate, to the radar data for the current scan time point, the radar data for respective scan time points corresponding to the predetermined number of previous scan time points. For example, the system 100 for processing radar data may generate refined data by sequentially accumulating radar data for respective closer scan time points (e.g., scan(nb_scan−1), scan(nb_scan−2), . . . ) to the current scan time point to the radar data for the current scan time point.

The system 100 for processing radar data according to an embodiment may convert at least a part of the radar data acquired at the previous scan time point and accumulate the converted radar data for the previous scan time point to the radar data for the current scan time point based on a time difference between the radar data (e.g., the first radar data) for the current scan time point and the radar data (e.g., the second radar data) for the previous scan time point.

The system 100 for processing radar data according to an embodiment may estimate a velocity of a point cloud included in the radar data in an operation 331. The system 100 for processing radar data according to an embodiment may estimate velocities of point clouds clustered at respective previous scan time points.

The clustering may refer to a set of two or more point clouds located at similar points. For example, the point clouds may be clustered by using a clustering algorithm such as DBSCAN, etc.

For example, a range rate ($\dot{r}_d$) of the point clouds may be defined according to the following equation. Herein, H denotes a direction vector, $\theta_n$ denotes an azimuth of an nth point cloud, $\dot{r}_{an}$ denotes a velocity of the nth point cloud, and $v_x$ and $v_y$ may denote rates on an x-axis and a y-axis in a coordinate system.

$$\dot{r}_d = \begin{bmatrix} \dot{r}_{d1} \\ \dot{r}_{d2} \\ \vdots \end{bmatrix} = Hv_{pc} = \begin{bmatrix} \cos\theta_1 & \sin\theta_1 \\ \cos\theta_2 & \sin\theta_2 \\ \vdots & \vdots \end{bmatrix}\begin{bmatrix} v_x \\ v_y \end{bmatrix} \qquad \text{[Equation 1]}$$

For example, the velocity of the point cloud may be estimated by the least square method according to the following equation.

$$v_{pc} = \left(H^T H\right)^{-1} H^T \dot{r}_d \qquad \text{[Equation 2]}$$

The system 100 for processing radar data according to an embodiment may convert the coordinate system of the point cloud data to express the overall data distribution and precise data of the object in an operation 332.

The system 100 for processing radar data according to an embodiment may convert the coordinate system of the point cloud data into Cartesian coordinates based on the range, elevation and/or azimuth according to the following equation.

$$x = r \times \cos(azi) \times \cos(ele) \qquad \text{[Equation 3]}$$
$$y = r \times \sin(azi) \times \cos(ele)$$
$$z = r \times \sin(azi)$$

The system 100 for processing radar data according to an embodiment may accumulate the point cloud data converted into the Cartesian coordinates as data on the x-axis and y-axis in the Bird's Eye View (BEV).

The system 100 for processing radar data according to an embodiment may predict a location of the point cloud in an operation 333. The system 100 for processing radar data may predict a location at the current time point of the radar data, which was acquired at the previous time point, based on the estimated velocity of the point cloud and a time difference between the current time point and the previous time point.

For example, the location at the current time point of the radar data, which was acquired at the previous time point may be predicted according to the following equation. Herein, $\Delta t$ denotes a cycle time between scan time points of the radar device 110, x and y indicate a location of the point cloud on the x-axis and y-axis, and $v_x$ and $v_y$ denote a velocity (relative velocity) of the point cloud on the x-axis and the y-axis. Also, n denotes a predetermined number of previous scan time points, and k may denote a current scan time point.

$$x_{k-n} = \begin{bmatrix} 1 & 0 & \Delta t \cdot n & 0 \\ 0 & 1 & 0 & \Delta t \cdot n \\ 0 & 0 & 1 & 0 \\ 0 & 0 & 0 & 1 \end{bmatrix} \cdot \begin{bmatrix} x \\ y \\ v_x \\ v_y \end{bmatrix}_{k-n} \quad \text{[Equation 4]}$$

The system 100 for processing radar data according to an embodiment may convert at least some attributes of the point cloud data in an operation 334.

The system 100 for processing radar data according to an embodiment may add a time-relevant attribute to the point cloud data included in the radar data and acquired at the previous time point based on the time difference between the previous time point and the current time point. For example, a time difference $\Delta t \times scan$ between scan time points may be added to the point cloud data acquired at the previous time point.

The system 100 for processing radar data according to an embodiment may convert a location-relevant attribute value of the radar data acquired at the previous time point based on the time difference between the previous time point and the current time point, and may preserve a time-irrelevant attribute value of the radar data acquired at the previous time point. For example, the system 100 for processing radar data may convert the location-relevant attribute value of the radar data acquired at the previous time point, such as x-axis coordinate, y-axis coordinate, z-axis coordinate, range, elevation and/or azimuth. For example, the system 100 for processing radar data may preserve the time-irrelevant attribute value, such as power and/or velocity.

The system 100 for processing radar data according to an embodiment may accumulate the point cloud data in an operation 335.

The system 100 for processing radar data may add the point cloud data of the converted radar data for previous time points scan(k−1), . . . , scan(k−n) to the radar data for a current time point scan(k) as shown in the following equation.

$$x_k = \{x_k, x_{k-1}, \ldots, x_{k-n}\} \quad \text{[Equation 5]}$$

The system 100 for processing radar data according to an embodiment may match the accumulated point cloud data to a map in an operation 336. Herein, the map may be acquired from GPS (global position system) data or data of another sensor and may correspond to real roads or routes. The system 100 for processing radar data may correct the accumulated point cloud data to the map.

The system 100 for processing radar data according to an embodiment may check whether the accumulation of the radar data for the previous scan time point is repeated as much as the predetermined number of previous scan time points in an operation 340.

If the accumulation of the radar data for the previous scan time point is not repeated as much as the predetermined number of previous scan time points (Operation 340—Yes), the system 100 for processing radar data according to an embodiment may repeat the accumulation (Operation 330) of the radar data for the previous scan time point.

The system 100 for processing radar data according to an embodiment may count the number of times of accumulation of the radar data for the previous scan time point (scan=scan−1) based on the current scan time point in an operation 350.

The system 100 for processing radar data according to an embodiment may determine whether the number of point cloud data is equal to or greater than a predetermined reference number in an operation 360, and if the number of point cloud data is equal to or smaller than the predetermined reference number (Operation 360—No), the system 100 for processing radar data may increase a predetermined number corresponding to the previous scan time point and repeat the accumulation (Operation 330) of the radar data for the previous scan time point.

If the number of point cloud data included in the generated refined data is equal to or smaller than the predetermined reference number (Operation 360—No), the system 100 for processing radar data may increase a predetermined number corresponding to the previous scan time point and generate refined data in the operation 330. For example, if the number of point cloud data included in the generated refined data is equal to or smaller than the predetermined reference number, the system 100 for processing radar data may generate refined data by further accumulating point cloud data acquired prior to the predetermined number of previous scan time points.

If the accumulation of the radar data for the previous scan time point is repeated as much as the predetermined number of previous scan time points (Operation 340—No) and the number of point cloud data included in the generated refined data is equal to or smaller than the predetermined reference number (Operation 360—Yes), the system 100 for processing radar data according to an embodiment may output the refined data generated by accumulating the radar data for the previous scan time point in an operation 370.

Figure 4:
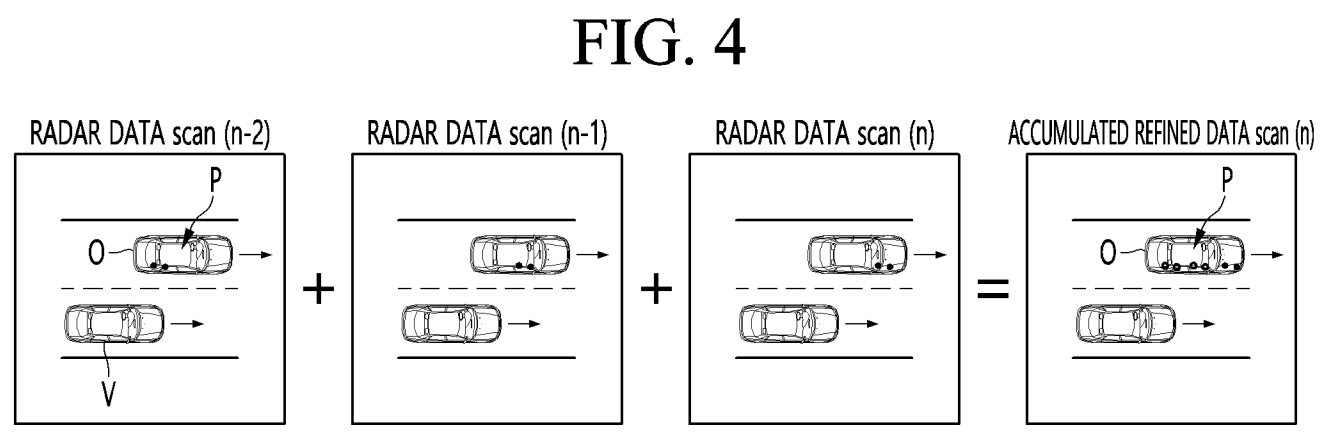

FIG. 4 shows an example process of accumulating radar data according to an embodiment of the present disclosure.

Referring to FIG. 4, the system 100 for processing radar data according to an embodiment may be mounted in a moving vehicle V, and may acquire radar data corresponding to an object O through the radar device 110. The radar data may include data of at least one point cloud P corresponding to the object O.

The radar data acquired through the radar device 110 may include radar data (radar data scan(n−2), radar data scan(n−1) and radar data scan(n)) corresponding to respective scan time points. The system 100 for processing radar data according to an embodiment may accumulate the radar data (radar data scan(n−2) and radar data scan(n−1)) corresponding to the previous scan time points to the radar data (radar data scan(n)) corresponding to the current scan time point.

For example, if the number of previous scan time points to be accumulated is determined to be two (2) and it is assumed that a movement velocity of the vehicle V is greater than that of the object O, the point cloud P corresponding to the object O may be acquired at each scan time point as shown in FIG. 4. The system 100 for processing radar data may predict a current location of a point cloud P acquired at a previous scan time point and convert the location of the point cloud P into the predicted location.

The system 100 for processing radar data may accumulate data of the point cloud P at the converted location included in the radar data (radar data scan(n−2) and radar data scan(n−1)) acquired at the previous scan time points to the radar data (radar data scan(n)) acquired at the current scan time point. Therefore, the number of point cloud data included in the refined data (accumulated refined data scan (n)) can increase compared to the radar data (scan(n)) acquired at the current scan time point.

The system 100 for processing radar data may generate input data (feature map) from the refined data to train the artificial intelligence model. The system 100 for processing radar data may design the type, format and structure of the input data to train the artificial intelligence model by designing a data structure. For example, the input data may be point cloud data in binary form (.bin), and may be radar point cloud data to which attribute value of time depending on the difference between scan time points are added.

The system 100 for processing radar data may refine and train the radar data according to the designed data format, or may refine the whole radar data by separating test data.

The system 100 for processing radar data may filter the point cloud which cannot be located according to specifications of the radar device 110 based on the location of the point cloud. For example, a point cloud spaced at a predetermined distance (e.g., 120 m) or more from the vehicle in which the system 100 for processing radar data is mounted or the radar device 110 may be filtered.

For example, the input data used to train the artificial intelligence model may have features as described below.

TABLE 1

| Input feature | Annotation | Equation | Description |
|---|---|---|---|
| $a_1$ | R | — | Range information of point clouds within a track |
| $a_2$ | A | — | Azimuth information of point clouds within a track |
| $a_3$ | E | — | Elevation information of point clouds within a track |
| $a_4$ | V | — | Velocity information of point clouds within a track |
| $a_5$ | Num | — | Number of point clouds within a track |
| $a_6$ | $\bar{d}$ | $\bar{d} = \sum_{i=1}^{n} d_i/n$ | Euclidean distance average of all point clouds within a track |
| $a_7$ | $d_{SD}$ | $d_{SD} = \sqrt{1/n \times \sum_{i=1}^{n}(d_i - \bar{d})^2}$ | Euclidean distance standard deviation of all point clouds within a track |
| $a_8$ | $d_{max}$ | $d_{max} = \max(d_1, d_2, \ldots, d_n)$ | Euclidean distance maximum of all point clouds within a track |
| $a_9$ | $d_{min}$ | $d_{min} = \min(d_1, d_2, \ldots, d_n)$ | Euclidean distance minimum of all point clouds within a track |
| $a_{10}$ | $X_d$ | $X_d = \max(dx_1, dx_2, \ldots, dx_n)$ | Maximum distance among all point clouds on an X-axis within a track |
| $a_{11}$ | $Y_d$ | $Y_d = \min(dy_1, dy_2, \ldots, dy_n)$ | Maximum distance among all point clouds on a Y-axis within a track |

Figure 5A:
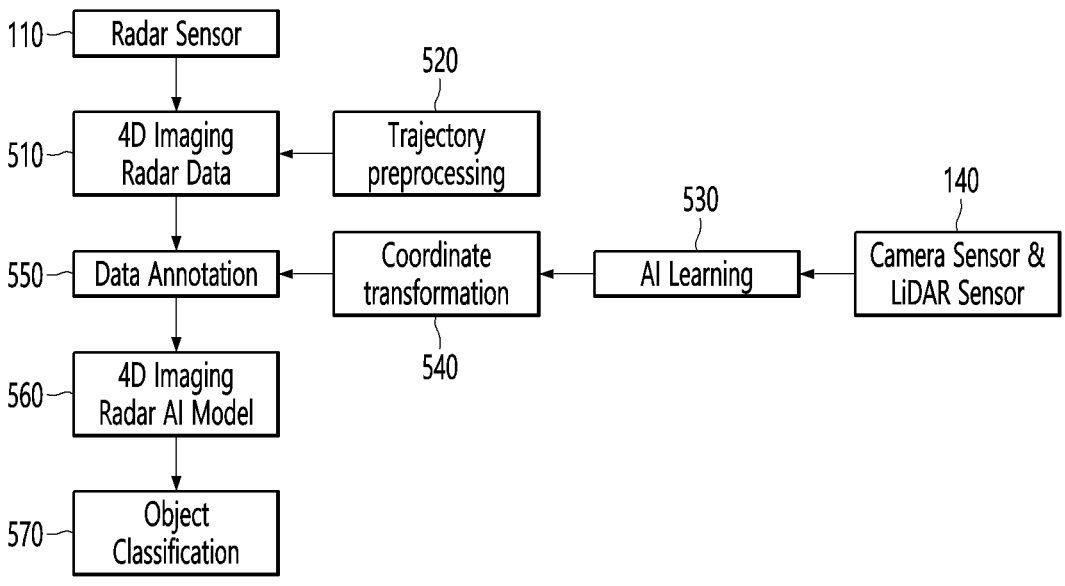
Figure 5B:
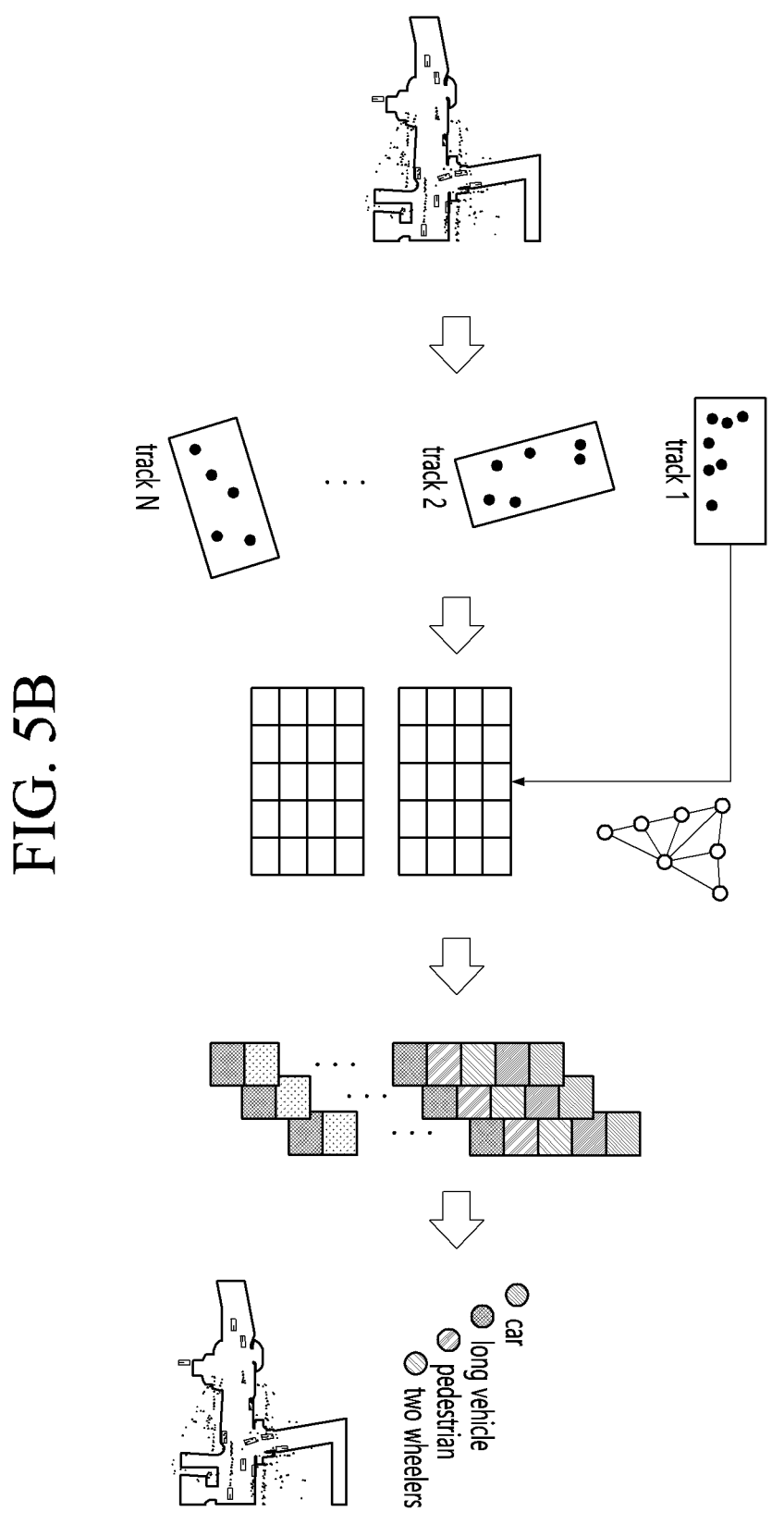

FIG. 5A and FIG. 5B are flowchart showing a training process of an artificial intelligence model by the system 100 for processing radar data according to an embodiment of the present disclosure.

Referring to FIG. 5A and FIG. 5B, the system 100 for processing radar data according to an embodiment may train an artificial intelligence model based on the refined data generated by accumulating the radar data for the previous scan time point.

The system 100 for processing radar data according to an embodiment may acquire radar data from the radar device 110 in an operation 510. The system 100 for processing radar data may extract point cloud data corresponding to respective tracks track 1, track 2, . . . , track n from the radar data.

The system 100 for processing radar data according to an embodiment may generate refined data by accumulating the radar data (e.g., point cloud data) acquired from the radar device 110 in an operation 520.

The system 100 for processing radar data according to an embodiment may acquire image data or LiDAR data from an external device 140 (e.g., a camera sensor or a LiDAR sensor), and may detect object-relevant information (ground truth) from point cloud data included in the acquired image data or LiDAR data based on the artificial intelligence model in an operation 530.

The system 100 for processing radar data according to an embodiment may convert the coordinate system in order for the detected object-relevant information to correspond to a coordinate system consistent with the radar data in an operation 540.

The system 100 for processing radar data according to an embodiment may generate annotations and metadata in an operation 550. The system 100 for processing radar data may generate an effective 3D bounding box by combining the point cloud data of the radar data with the object-relevant information (ground truth) detected by using the image data or LiDAR data and the artificial intelligence model.

The annotations and/or the metadata that explain or describe information about the radar data may be generated. The annotations and the metadata may be in JSON form (.json). The annotations may include information about the 3D bounding box (e.g., identifier (id), type (category), sensor reference location information (location[x,y,z]), size information (size[width,length,height]), host vehicle reference distance (distance), other rpt vehicle rotation information (rotation y), etc.). The metadata may include information about data collection (file name, date, weather, location information) and CAN (wheel, ego, steering). The annotations and the metadata may be used to manage, search, secure and analyze information of the data.

The system 100 for processing radar data may examine the quality and integrity of the input data to use only verified input data for model training. For example, the system 100 for processing radar data may read a binary file generated by verifying point cloud data of refined data to verify whether there is a problem with the format or there is missing information, and may read a JSON file generated by verifying annotations through combination with accurate information (ground truth) between sensors to verify whether there is a problem with the format or there is missing information. The system 100 for processing radar data may closely analyze data by using date, place, weather or annotations based on metadata to intuitively analyze data imbalances during training of an artificial intelligence model.

The system 100 for processing radar data according to an embodiment may generate an artificial intelligence model based on the generated refined data in an operation 560. The artificial intelligence model may be trained to receive radar data (e.g., third radar data) acquired from the radar device 110 and detect an object corresponding to the radar data. For example, the artificial intelligence model may be generated by a Graph Neural Network, a PointNet, a Point Transformer, etc.

The system 100 for processing radar data may randomly initialize weights of a neural network which is a learning model (e.g., Xavier, He, etc.). For example, the weights of the neural network which is a learning model may be initialized with a Xavier according to the following equation.

$$W = \text{random value} \times \sqrt{\frac{2}{n_{in} + n_{out}}} \qquad \text{[Equation 6]}$$

Herein, $n_{in}$ denotes the number of input neurons and $n_{out}$ denotes the number of output neurons.

The system 100 for processing radar data may select a loss function indicative of the difference between a prediction label and a true label to calculate the degree of misprediction of the algorithm during training. For example, the loss function may be defined by using categorical cross entropy according to the following equation.

$$L(y, \hat{y}) = -\sum_{i=1}^{N}\sum_{c=1}^{C} y_{ic} \log(\hat{y}_{ic}) \qquad \text{[Equation 7]}$$

Herein, N denotes the number of point cloud data, C denotes the number of classes, y denotes a one-hot encoding value of the true label, and ŷ denotes a probability distribution of input data predicted by the model. $y_{ic}$ is set to 1 when an ith data point belongs to a class C. Otherwise, $y_{ic}$ is set to 0. $\hat{y}_{ic}$ denotes a prediction probability that the ith data point belongs to the class C.

The system 100 for processing radar data may select an optimization model by adjusting a weight based on a loss value extracted according to the loss function. Parameters of the optimization model may be adjusted to minimize the loss function. For example, a weight may be adjusted by using an Adam, which is a representative optimization model, according to the following equation.

$$w = w - \alpha \frac{\hat{m}_t}{\sqrt{\hat{v}_t} + \epsilon} \qquad \text{[Equation 8]}$$

Herein, w denotes a weight, $\alpha$ denotes a learning rate, $\hat{m}_t$ denotes an exponentially weighted average of gradients, $\hat{v}_t$ denotes an exponentially weighted average of squares of the gradients, and & denotes a correction value (e.g., e^(−8)) to prevent the denominator from being 0.

The system 100 for processing radar data may train the artificial intelligence model by optimally updating weights of the selected artificial intelligence model into a learning dataset. For example, the system 100 for processing radar data may batch the learning data to each epoch. The epoch refers to one iteration of training the artificial intelligence model, and the batch refers to dividing the whole data into small batches by a gradient descent method when the model is trained to independently train the model in each batch and repeat this process. The system 100 for processing radar data may calculate a loss value between a prediction result and a label (loss function), and calculate a gradient for each weight in a reverse direction of an artificial intelligence neural network model according to a backpropagation algorithm by calculating a gradient of the loss function for each weight. The system 100 for processing radar data may update the weights of the model according to an optimization algorithm.

The system 100 for processing radar data may detect overfitting of the model during training and adjust hyper parameters based on the verified data separated from the learning data. The overfitting refers to a situation where the model is trained dependent on training data only and the performance is greatly degraded when other data is input and used. The adjustment of the hyper parameters refers to an experimental process for inducing the model to exhibit the best performance by adjusting a learning rate, a batch size, etc. of the optimization model. That is, the model that can exhibit the optimal performance can be generated by examining whether the model has been trained well during verification and evaluation of the model and adjusting the hyper parameters to train the model well when the model has not been trained well.

The system 100 for processing radar data according to an embodiment may detect and visualize an object based on the generated artificial intelligence model in an operation 570. The system 100 for processing radar data may recognize and identify an object corresponding to the acquired radar data (e.g., third radar data) in real time (e.g., Car, Long Vehicle, Pedestrian, Two wheelers (Motorcycle, Bicycle)) based on the generated artificial intelligence model.

Figure 6:
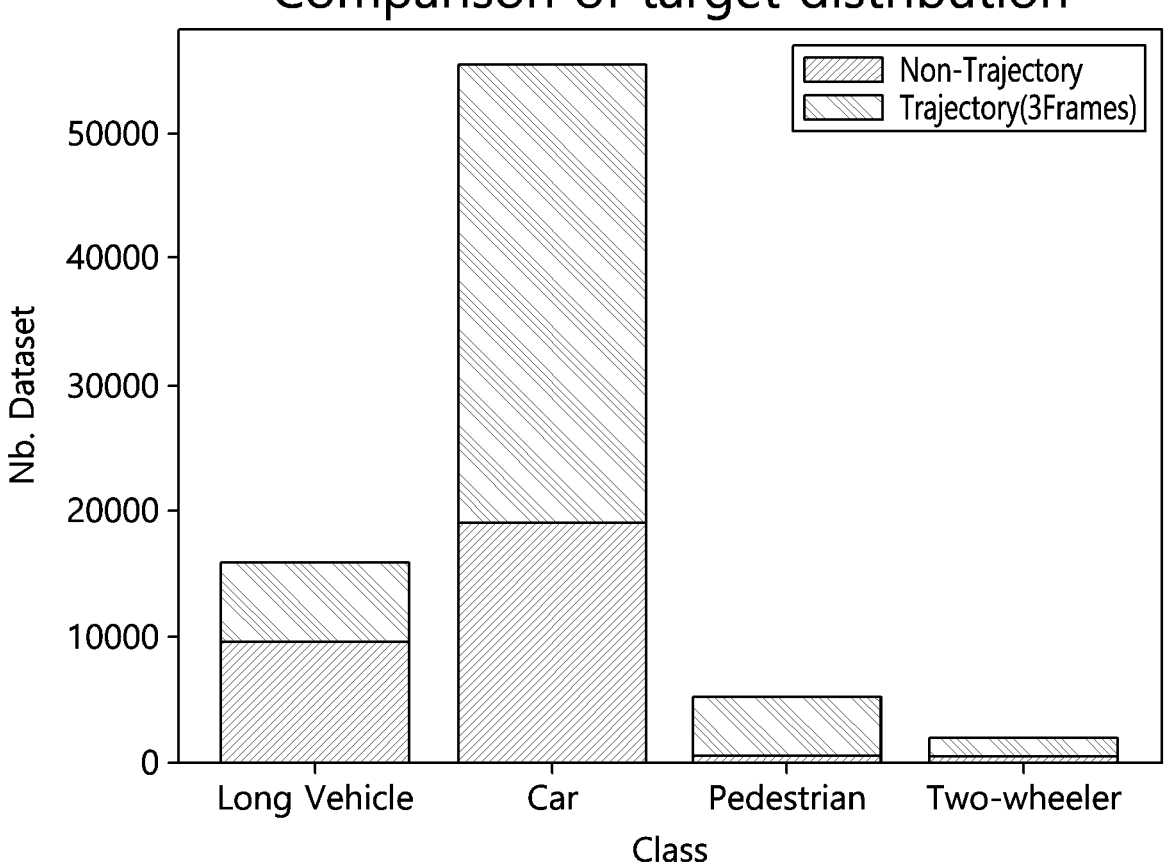
FIG. 6 shows the performance of the system for processing radar data according to an embodiment of the present disclosure.

FIG. 6 shows the performance of the system 100 for processing radar data according to an embodiment of the present disclosure.

FIG. 6 illustrates the result of classifying classes of objects into Long vehicle, Car, Pedestrian and Two-wheeler based on the radar data and the artificial intelligence model. In a case where radar data Trajectory(3 Frames) acquired after radar data processing of the present disclosure are used, the number of learning datasets is greatly increased compared to a case where radar data Non-Trajectory acquired before radar data processing are used.

Further, it can be seen from the following table that in a case where the radar data Trajectory(3 Frames) acquired after radar data processing of the present disclosure are used, both Macro F1-Score and Micro F1-Score are improved compared to a case where the radar data Non-Trajectory acquired before radar data processing are used.

TABLE 2

|  | Non-Trajectory | Trajectory(3 Frames) |
|---|---|---|
| Macro F1 - Score | 76.5 | 77.8 |
| Micro F1 - Score | 48.6 | 56.3 |

Macro F1-Score is a performance indicator based on an F1-score mean for all classes in multiclass classification, and Micro F1-Score is a performance indicator derived in consideration of precision and recall of all classes in multiclass classification.

Figure 7A:
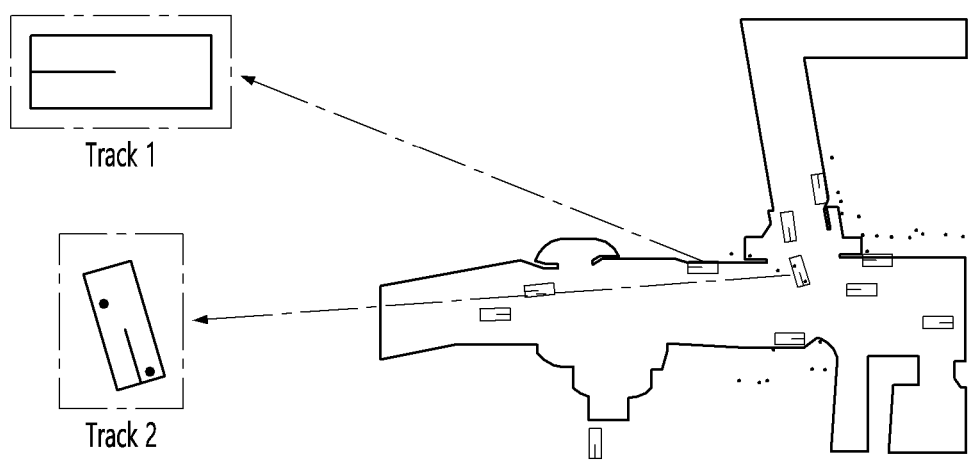
FIG. 7A illustrates a map of radar data acquired from a radar device.
Figure 7B:
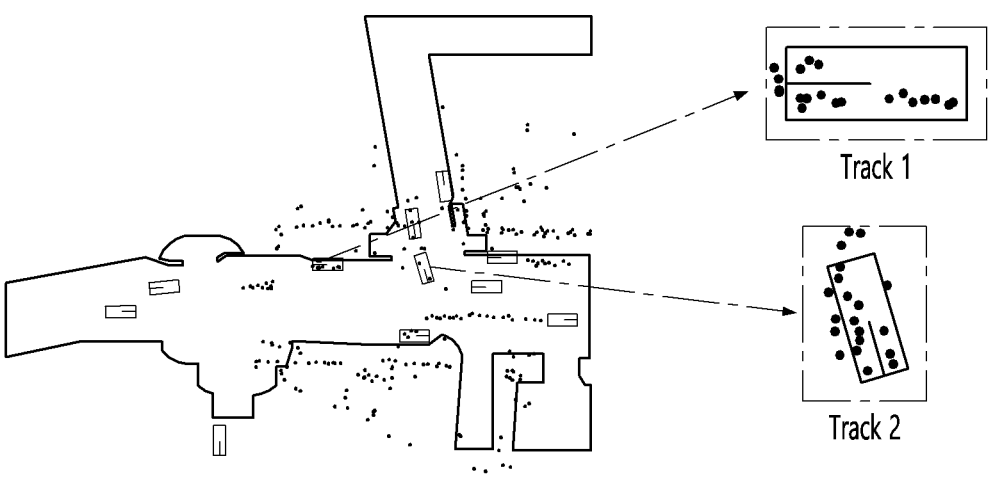
FIG. 7B illustrates a map in which data processing according to an embodiment of the present disclosure is applied to radar data.
Figure 7C:
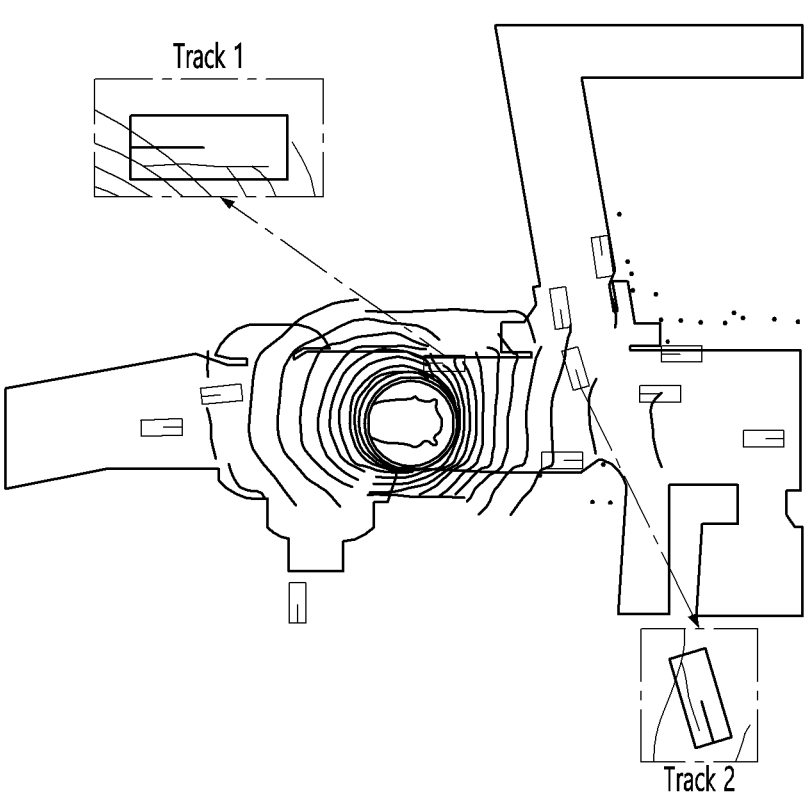
FIG. 7C illustrates a map of LiDAR data acquired from a LIDAR device according to an embodiment of the present disclosure.

FIG. 7A illustrates a map of radar data acquired from the radar device 110. FIG. 7B illustrates a map in which data processing according to an embodiment of the present disclosure is applied to radar data. FIG. 7C illustrates a map of LiDAR data acquired from a LIDAR device according to an embodiment of the present disclosure.

As shown in FIG. 7A, it can be seen that point clouds are sparse in the radar data acquired from the radar device 110. Specifically, it can be seen that point clouds are sparse in Track 1 and Track 2.

In contrast, as shown in FIG. 7B, it can be seen that a large number of point clouds are included in the radar data when data processing according to an embodiment of the present disclosure is applied. Specifically, it can be seen that a large number of point clouds are included in Track 1 and Track 2.

Therefore, when data processing according to an embodiment of the present disclosure is applied, performance equivalent to that of point clouds included in a map of LiDAR data shown in FIG. 7C can be secured.

FIG. 8 is a flowchart 800 showing a method for processing radar data according to an embodiment of the present disclosure.

Referring to FIG. 8, the system 100 for processing radar data according to an embodiment may acquire first radar data corresponding to a target area and second radar data generated prior to the generation of the first radar data from the radar device 110 in an operation 810.

The system 100 for processing radar data according to an embodiment may convert at least a part of the second radar data based on a time difference between a time point at which the first radar data is acquired and a time point at which the second radar data is acquired in an operation 830.

The system 100 for processing radar data according to an embodiment may generate refined data by considering the converted second radar data for trajectory processing along with the first radar data in an operation 850.

The system 100 for processing radar data according to an embodiment may receive third radar data and generate an artificial intelligence model trained to detect an object corresponding to the third radar data based on the generated refined data in an operation 870.

In the system 100 for processing radar data described above, the method of processing radar data may also be implemented in form of a computer program stored in a computer-readable recording medium executed by a computer or a recording medium containing instructions executable by a computer. In addition, the method of processing radar data in the system 100 for processing radar data described above may also be implemented in the form of a computer program stored in a computer-readable recording medium that is executed by a computer.

Computer-readable recording media may be any available media that can be accessed by a computer and includes both volatile and non-volatile media, removable and non-removable media. Additionally, computer-readable recording media may include computer storage media. Computer storage media includes both volatile and non-volatile, removable and non-removable media implemented in any method or technology for storage of information such as computer-readable instructions, data structures, program modules or other data.

The functions realized by the components described in the specification herein may be implemented in general-purpose processors, special-purpose processors, integrated circuits, application specific integrated circuits (ASICs), central processing units (CPUs), circuits, and/or processing circuitry including combinations of these programmed to realize the described functions. A processor contains transistors or other circuits and is considered a circuit or processing circuit. The processor may be a programmed processor that executes a program stored in memory.

In the specification herein, a circuit, part, unit, or means is hardware programmed or executing hardware to realize the described function. The hardware may be any hardware disclosed herein or any hardware known to be programmed or executing the described functions.

If the hardware is a processor that is considered a circuit type, then the circuit, the part, means or unit in question is a combination of hardware and software used to configure the hardware and or processor.

A system for processing radar data according to an embodiment of the present disclosure includes, a radar device, at least one processor and at least one memory including a computer program code, wherein the at least one memory and the computer program code are configured to, with the at least one processor, cause the system to, acquire first radar data corresponding to a target area and second radar data generated prior to the generation of the first radar data from the radar device, convert at least a part of the second radar data based on a time difference between a time point at which the first radar data is acquired and a time point at which the second radar data is acquired, and generate refined data by considering the converted second radar data for trajectory processing along with the first radar data.

The system for processing radar data according to an embodiment of the present disclosure, wherein the first radar data include data acquired at a first scan time point, the second radar data include data acquired at at least one second scan time point prior to the first scan time point, and the at least one second scan time point includes a predetermined number of time points.

The system for processing radar data according to an embodiment of the present disclosure, wherein the at least one memory and the computer program code are configured to, with the at least one processor, cause the system to, the converting of the at least the part of the second radar data includes, converting the at least the part of data included in the second radar data corresponding to the at least one second scan time point based on a time difference between the first scan time point and the at least one second scan time point.

The system for processing radar data according to an embodiment of the present disclosure, wherein the first radar data and the second radar data include point cloud data including at least one of range, azimuth, elevation, velocity, and power.

The system for processing radar data according to an embodiment of the present disclosure, wherein the at least one memory and the computer program code are configured to, with the at least one processor, cause the system to: the converting of the at least the part of the second radar data includes, clustering the point cloud data included in the second radar data, and estimating a velocity of the clustered point cloud data.

The system for processing radar data according to an embodiment of the present disclosure, wherein the at least one memory and the computer program code are configured to, with the at least one processor, cause the system to, the converting of the at least the part of the second radar data includes, predicting a location of the second radar data based on the estimated velocity of the point cloud data and the time difference between the time point at which the first radar data is acquired and the time point at which the second radar data is acquired.

The system for processing radar data according to an embodiment of the present disclosure, wherein the at least one memory and the computer program code are configured to, with the at least one processor, cause the system to, the converting of the at least the part of the second radar data includes, adding a time-relevant attribute value to the point cloud data included in the second radar data based on the time difference between the time point at which the first radar data is acquired and the time point at which the second radar data is acquired.

The system for processing radar data according to an embodiment of the present disclosure, wherein the at least one memory and the computer program code are configured to, with the at least one processor, cause the system to, the converting of the at least the part of the second radar data includes, converting a location-relevant attribute value of the second radar data based on the time difference between the time point at which the first radar data is acquired and the time point at which the second radar data is acquired, and preserving a time-irrelevant attribute value of the second radar data.

The system for processing radar data according to an embodiment of the present disclosure, wherein each of the first radar data and the second radar data includes point cloud data, and the at least one memory and the computer program code are configured to, with the at least one processor, cause the system to, the generating of the refined data includes, adding the point cloud data of the converted second radar data to the first radar data.

The system for processing radar data according to an embodiment of the present disclosure, wherein the at least one memory and the computer program code are configured to, with the at least one processor, cause the system to, when the number of point cloud data included in the generated refined data is equal to or smaller than a predetermined reference number, generate the refined data by increasing the predetermined number of time points included in the at least one second scan time point.

The system for processing radar data according to an embodiment of the present disclosure, wherein the at least one memory and the computer program code are configured to, with the at least one processor, cause the system to, receive third radar data acquired from the radar device and generate an artificial intelligence model trained to detect an object corresponding to the third radar data based on the generated refined data.

A method for processing radar data according to an embodiment of the present disclosure includes, acquiring first radar data corresponding to a target area and second radar data generated prior to the generation of the first radar data from a radar device, converting at least a part of the second radar data based on a time difference between the time point at which the first radar data is acquired and a time point at which the second radar data is acquired, and generating refined data by considering the converted second radar data for trajectory processing along with the first radar data.

We claim:

1. A system for processing radar data, comprising:
a radar device;
at least one processor; and
at least one memory including a computer program code,
wherein the at least one memory and the computer program code are configured to, with the at least one processor, cause the system to:
acquire, from the radar device, first radar data corresponding to a first scan time point and second radar data corresponding to a plurality of second scan time points occurring prior to the first scan time point;
perform trajectory preprocessing on the second radar data to generate converted second radar data based on a time difference between the first scan time point and each of the plurality of second scan time points; and
generate refined data by accumulating the converted second radar data together with the first radar data,
wherein performing the trajectory preprocessing comprises:
clustering point cloud data included in the second radar data to form a plurality of clusters;
estimating a velocity vector of each cluster of the plurality of clusters;
predicting a location of each radar point of the second radar data at the first scan time point based on the estimated velocity vector and the time difference; and
converting the second radar data based on the predicted location.

2. The system of claim 1,
wherein the first radar data and the second radar data include point cloud data including at least one of range, azimuth, elevation, velocity, and power.

3. The system of claim 2,
wherein the converting the second radar data includes:
adding a time-relevant attribute value to the point cloud data included in the second radar data based on the time difference between the time point at which the first radar data is acquired and the time point at which the second radar data is acquired.

4. The system of claim 1,
wherein the converting the second radar data includes:
converting a location-relevant attribute value of the second radar data based on the time difference between the time point at which the first radar data is acquired and the time point at which the second radar data is acquired, and preserving a time-irrelevant attribute value of the second radar data.

5. The system of claim 1,
wherein each of the first radar data and the second radar data includes point cloud data, and
the generating of the refined data includes:
adding the point cloud data of the converted second radar data to the first radar data.

6. The system of claim 1,
wherein the at least one memory and the computer program code are configured to, with the at least one processor, cause the system to:
when the number of point cloud data included in the generated refined data is equal to or smaller than a predetermined reference number,
generate the refined data by increasing the predetermined number of time points included in the plurality of second scan time points.

7. The system of claim 1,
wherein the at least one memory and the computer program code are configured to, with the at least one processor, cause the system to:
receive third radar data acquired from the radar device and generate an artificial intelligence model trained to detect an object corresponding to the third radar data based on the generated refined data.

8. A method for processing radar data, comprising:
acquiring, from a radar device, first radar data corresponding to a first scan time point and second radar data corresponding to a plurality of second scan time points occurring prior to the first scan time point;
performing trajectory preprocessing on the second radar data to generate converted second radar data based on a time difference between the first scan time point and each of the plurality of second scan time points; and
generating refined data by accumulating the converted second radar data together with the first radar data,
wherein performing the trajectory preprocessing comprises:
clustering point cloud data included in the second radar data to form a plurality of clusters;
estimating a velocity vector of each cluster of the plurality of clusters;
predicting a location of each radar point of the second radar data at the first scan time point based on the estimated velocity vector and the time difference; and
converting the second radar data based on the predicted location.

* * * * *